United States Patent [19]
Fels et al.

[11] Patent Number: 5,345,781
[45] Date of Patent: Sep. 13, 1994

[54] DEVICE FOR COOLING OF FLUIDS AND EDIBLE FOAMS

[76] Inventors: Ulrich Fels, Rue de Sées 42, 4154 Tönisvorst, Fed. Rep. of Germany; Erich Windhab, Burgrain 37, 8706 Meilen, Switzerland; Ralf Hoffmann, Wilhelmstrasse 44, 4320 Hattingen 13, Fed. Rep. of Germany; Peter von Holdt, Bachstelzenweg 1, 2401 Gross Grönau, Fed. Rep. of Germany; Lutz Hahn, Mecklenburger Strasse 23, 2401 Gross Grönau, Fed. Rep. of Germany

[21] Appl. No.: 12,146

[22] Filed: Jan. 28, 1993

[51] Int. Cl.$^5$ .............................. A23G 9/20
[52] U.S. Cl. ........................ 62/343; 366/85; 366/301
[58] Field of Search ............. 62/343; 366/85, 301

[56] References Cited

U.S. PATENT DOCUMENTS

| | | | |
|---|---|---|---|
| 2,713,253 | 7/1955 | Chandler | 62/114 |
| 3,780,536 | 12/1973 | Fishman et al. | 62/342 |
| 3,883,122 | 5/1975 | Werner | 366/85 |
| 4,034,967 | 7/1977 | Gustairs | 366/301 |
| 4,234,259 | 11/1980 | Wiedmann et al. | 366/85 X |
| 4,733,607 | 3/1988 | Star et al. | 62/343 X |
| 5,048,971 | 9/1991 | Wall et al. | 366/301 X |

FOREIGN PATENT DOCUMENTS

| | | |
|---|---|---|
| 3918268 | 7/1990 | Fed. Rep. of Germany . |
| 3905946 | 8/1990 | Fed. Rep. of Germany . |

OTHER PUBLICATIONS

Kanzaki, M., Japanese Application No. 64-163228, Feb. 2, 1991, "Continuous Production of Whipped Food Product and Apparatus Therefor" (Abst. 1991).
Osada, M., Japanese Application No. 60-184781, Mar. 10, 1987, "Production of Edible Dough Using Twin-Screw Extruder and Device" (Abst. 1987).
Deutsches Patentamt Search Report dated Aug. 24, 1992.

*Primary Examiner*—William E. Tapoloal
*Attorney, Agent, or Firm*—Arnold, White & Durkee

[57] ABSTRACT

The invention pertains to a device for the cooling of edible foams, where a cooling or freezing system for pre-freezing of the foam is directly outlet-connected to an aeration system, a motor driven extruder device designed as combined deep freezing and transport device is outlet-connected to the cooling and freezing system, in which the pre-frozen foam can be cooled down to storage temperature, and the aeration device, the cooling or freezing system and the extruder device are connected together by means of pipes. The device of the present invention is characterized in that the extruder device has at least one double screw system with two screws positioned parallel to each other with their rotational axes. The lands of the screws of the double screw system scrape against the inner cylinder mantle surface of the housing surrounding it. The threads of the second screw are centered between the threads of the first screw and an increased spacing of the rotational axes of the screws is created, so that the front side of the screw thread of the other screw facing the surface of the cylinder mantle of each screw, has a radial distance from it. The lands of the screws with the surface of the cylinder mantle of the screws and of the inner surface of the cylinder mantle of the housing bounds an extremely flat screw channel.

7 Claims, 7 Drawing Sheets

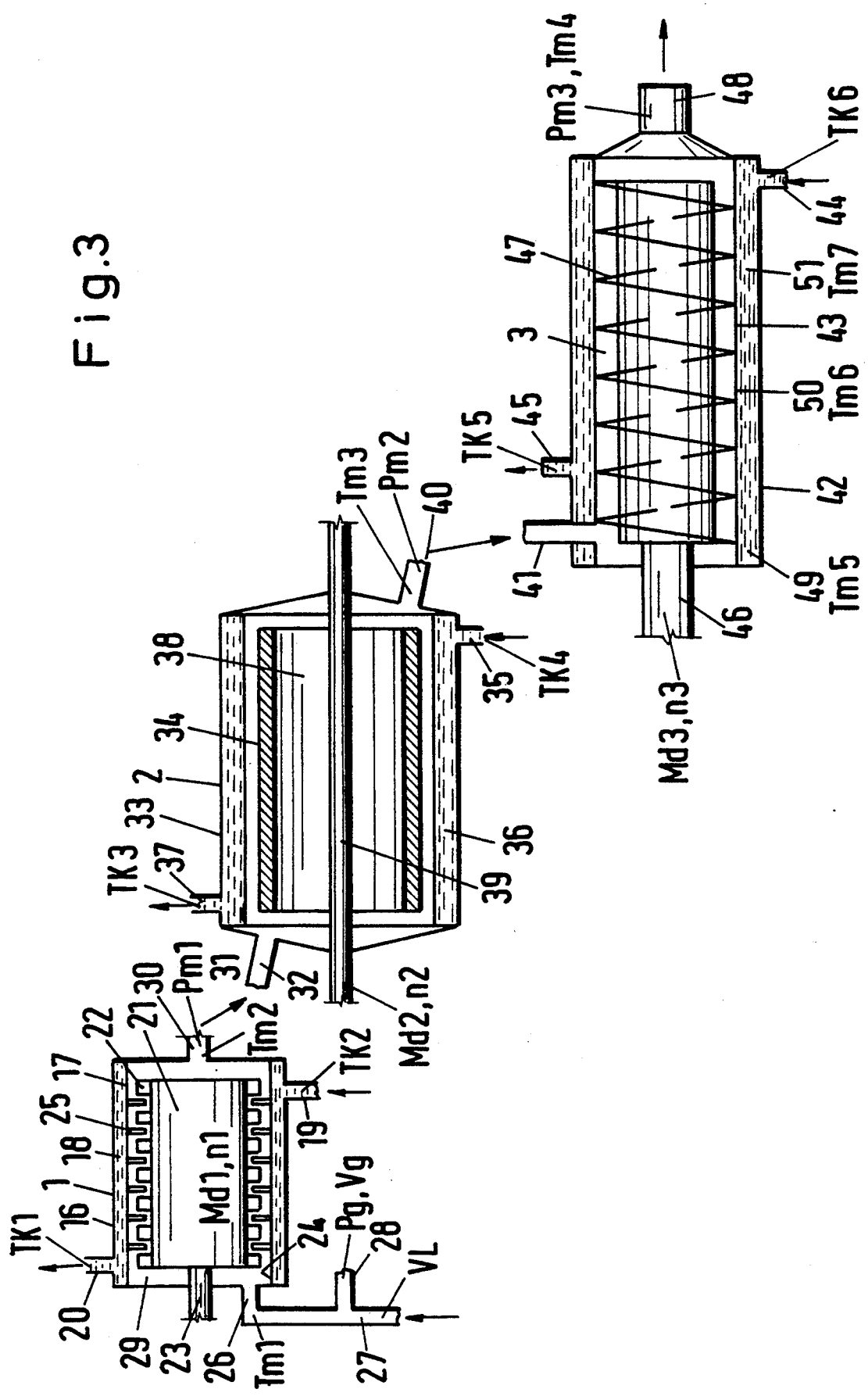

DEVICE FOR COOLING OF FLUIDS AND EDIBLE FOAMS

BACKGROUND OF THE PRESENT INVENTION

In wide areas of the foods industry, foams are used for the production of foods and/or luxury foods. These foams have in the first place, the advantage that they increase the enjoyment value of the particular product, and secondly, the volume will be increased by beating in some air.

Two classical examples of these food foams are whipped cream and ice cream. The volume of both products is increased to about double by the incorporation of air. The fine distribution of the air bubbles is an essential quality criterion both for ice cream as well as for whipped cream. In both the aforementioned products, it is only this incorporation of air which makes the product suitable for consumption:

In whipped cream, the high fat content would essentially prohibit the product's consumption in its original liquid form.

In ice cream, the incorporation of air results in the ice cream attaining a creamy consistency; without the incorporation of air, it is merely a solid-frozen block.

The technologies for continuous aeration (incorporation of air) in whipped cream and ice cream manufacturing are known around the world. The technologies for whipped cream and ice cream do, indeed, differ from one another significantly, but their basic principle is nonetheless the same.

The distribution of deep-frozen products, and thus the sales of such, have more than doubled in recent year. Although deep-freezing was used initially only to keep vegetables fresh, the entire range of foodstuffs is presently available in the form of deep-frozen versions of all goods also available in fresh form. Having started with the deep-freezing of vegetables, the dissemination of deep-frozen food now ranges from ready-cooked meals to all types of bakery goods. Within this range of deep-frozen goods, ice cream occupies a special and significant rank. In fact, for ice cream this is the only possible marketing route, via a complete and uninterrupted deep-frozen chain. The industry has been making efforts to market cakes and gateaux on a whipped-cream basis in the form of deep-frozen products for some fifteen years. Continuously rising sales in this sector illustrate the great market potentials for this segment. The technology for manufacture of such deep-frozen cakes and gateaux is, however, largely underdeveloped, if one disregards the use of continuously operating automatic aerators.

Ice cream manufacturing technology has not undergone any further significant technical changes since the introduction of continuous cooling and freezing systems (freezers). Here, work is still conducted on the same principles as were used thirty years ago, if one disregards technical modifications concerned solely with control of the ice cream cooling and freezing system.

The Current Procedure for Making Gateaux

In the procedure currently used in the manufacture of deep-frozen gateaux, a suitable jelling agent is added to the mixture of whipped cream and sugar. This whipped cream is then pasteurized and matured in maturation tanks for approximately 24 hours at +5° C. The cream is then fed by means of a conveying pump to the continuously operating aerator. This aerator is simultaneously supplied with compressed air. Both fluids are mixed with one another on a rotor-stator principle, resulting in the whipped cream absorbing air.

The whipping of cream results in a three-phase system, comprising the air, fat and serum phases. Air bubbles are beaten into this emulsion (aeration). A portion of the fat particles are destroyed in the process. The fat is present at low temperatures partially in solid crystallized form, a small portion of the fat, however, still being trapped in liquid form in fat particles. The mechanical effects of the rotor-stator system result in the disintegration of these fat particles. A portion of the free fat escapes. The beaten and the intact fat particles then accumulate on the air/serum boundary.

Due to their hydrophobic properties, parts of fat particles project out of the monomolecular layers of crystalline fat into the interior of the air bubbles. Free liquid fat serves to bind the solidified fat with it. In the serum phase, the number of intact fat particles decreases during whipping (aeration). The proteins remain in the serum phase. This cycle produces a stable foam (whipped cream). This foam is then transferred layer-by-layer into gateaux molds using a filling system. The foam has a consistency which just permits transfer by means of volumetric feeders. The jelling agents present in the cream set only after several minutes, i.e., they form a structure within the structure of the foam, the fat particles and the air bubbles being fixed in position by these structure-forming jelling agents. The water is also bound simultaneously to these jelling agents.

Following aeration and metered feeding of the cream into appropriate cake molds, these gateaux are transferred to a solidifying tunnel for deep-freezing. During deep-freezing, the gateaux pass through an air current at approx. −45° C., and yield their heat to this current of air, resulting in them having a center temperature of −18° C. after a cooling period of some two to three hours. In this relatively slow freezing cycle, the water present in the product freezes out in the form of relatively large crystals of ice. The formation of these ice crystals causes the partial destruction of the structure previously formed by the jelling agent. It is also possible for crystals of ice growing during the freezing process to puncture the tiny air bubbles, thus destroying the membrane of these air bubbles. This is not a significant disadvantage, provided the product remains frozen, i.e., the water is present in the product in solid form.

During thawing of the product, the solid water in the ice crystals transforms into a liquid water phase. Concentration of the droplets of water occurs. The structure formed by the jelling agent and the emulsion consisting of air, fat and serum can then no longer fully contain these accumulations of water, which are greater than those present in the initial product, and the product becomes wet during thawing.

The relatively slow freezing process also results in the destruction of a portion of the air bubbles. This damage in the product is irreparable and results in a reduction of product volume during thawing.

This problem can, indeed, be countered by means of increased addition of jelling agents, a partial solution which, however, involves the disadvantage of affecting the flavor of the product. Deep-frozen whipped cream treated in this way no longer retains its fullness of flavor after thawing. Contrary to the situation with other foodstuffs, the deep-freezing of whipped cream using the technology currently available does not constitute a method of preserving its quality. On the contrary, deep-freezing impairs this product's quality.

The Present Manufacture of Ice Cream

Ice cream recipes normally consist of milk, skimmed milk, cream, milk concentrate, milk powder or butter, and sucrose, glucose or dextrose from fruit products, which can be added, and of hydrocolloids which act as stabilizers (vegetable binding agents, alginates, carrageenates, carob bean flour, etc.).

For the manufacture of ice cream, the individual components are weighed to accord with a specific recipe and adjusted to a defined ratio. These individual components are then mixed with one another in a mixing vessel. Mixing is completed after a fifteen minute period of mixing at 63° C. Mixing is followed by pasteurization at 80° to 85° C. for a period of 20 to 40 sec. After this heat treatment, the mixture is cooled to approximately 70° C. and then homogenized in a two-stage homogenizer, at 150 bar in the first stage, and 40 to 50 bar in the second stage. The fat particles are reduced in this process to below 2 $\mu$m.

This homogenization cycle is followed by cooling of the mixture down to 2° to 4° C. The mixture is then transferred to tanks, where it is available for further processing following a maturation period of 2 to 24 hours. This maturation period results in swelling of the hydrocolloids, hydration of the casein and an increase in viscosity, the structure of the ice cream becoming finer. Resistance to melting and aeration are improved simultaneously, the fat crystallizes out and a balanced aroma is formed. After completion of the maturation cycle, this mixture is transferred to the cooling or freezing system for freezing and for simultaneous incorporation of air (aeration).

In present-day industrial practice, the mixtures for ice cream are partially frozen in continuously operating cooling or freezing systems (freezers). A cutter shaft consisting of chromium-nickel steel rotates within a chromium-plated tube at a speed of approximately 200 rpm. The cutters continuously scrape off a thin film of ice forming on the refrigerated internal wall of the tube and also ensure intimate mixing of the air fed in this cylinder.

FRIGEN (TM) or ammonia is generally used within a −25° to −30° C. temperature range for refrigeration of the cylinder from outside. The small ice crystals desired necessitate high-speed freezing, which is made possible by the highly cooled internal walls of the cylinder.

The mixture enters the freezing cylinder at a temperature of approximately 4° C. once the quantity of air necessary for aeration has been metered into it. The air is beaten into the mixture at the pressure of approximately 3 to 5 bar normally present in the interior of the cylinder. The freezing process occurs simultaneously, and the ice cream leaves the cooling or freezing system in paste form. The maximum temperature achievable using this process is −8° C.

The ice produced in this way is packed into tubs or cornets. These products must then be subjected to an after-freezing process, in order to achieve their storage temperature of −20° C. If this process is not applied, the water-ice crystals present in the ice cream become larger, resulting in the ice cream having a rough and gritty flavor. The ice cream cooling and freezing systems currently available on the market do not permit temperatures lower than −8° C.

In the present state of the art, ice cream foams can be produced and frozen down to approximately −7° C. But this temperature is not yet the storage temperature. Rather, the storage temperature of −20° C. will not be reached until after post-hardening in the deep-freezing tunnels. To carry out this method, large investment costs are necessary, in particular for the deep-freezing tunnel. Moreover, the continuing energy costs are considerable. In the area of the manufacture of whipped cream, aeration methods are already known that operate exclusively in the above-freezing temperature range. But the freezing of whipped cream foams is entirely unknown in this case.

A New Method and Device for Cooling Edible Foams

In order to remedy the deficiencies described above, the method and device disclosed in German Patent No. 3,918,268 may be used. (Applicants Hoffman and Windhab are co-inventors, along with two others, of this method and device, which are also the subject of co-pending U.S. patent application Ser. No. 07/777,375.) This method and device make it possible for edible foams (e.g., ice cream and whipped cream) to be cooled to storage temperature, e.g. to −20° C. in the same step, during and/or in direct conjunction with the aeration. Thus for example, the water present in whipped cream or similar items, will be frozen into ice crystals with a size less than 20 to 30 $\mu$m by extremely fast cooling with simultaneous, dynamic stress. At a size of the ice crystals of 20 to 30 $\mu$m, the danger that the product will exude moisture after thawing, is considerably less. Likewise, the air distribution in the product is more stable, since an "injury" of the air bubbles is unlikely given this size of ice crystal.

When using a high-speed freezing process of this type, the full flavor of the whipped cream can be retained, the fraction of jelling agent can be reduced, and the approximation of a freshly produced product is much greater. Finally, due to the absence of a volume reduction, a form-stable product will be obtained which is of great advantage for the production of gateaux, for example.

Due to the combination of the aeration and freezing process, it is thus now possible to simultaneously aerate and deep-freeze whipped cream on a continuous basis. After-freezing of whipped cream products in a hardening tunnel by using cold air at about −45° C. is thus no longer necessary. Since the minimum temperature of −18° C. or less necessary for the deep-frozen products is attained in the production process, a subsequent freezing process has now become dispensable in any case.

In addition, when using this method, a fine distribution of water crystals can be attained. When using this method, edible foams can thus be produced on a basis other than on whipped cream, and due to the freezing process they can be brought into a storable form. For example, this method may be used with fruit foams, e.g. foamed banana puree, and other milk products, such as, fruit yogurts or similar items.

Due to the use of this method, completely new foods can be produced in a simple manner with low consumption of energy or fuel, and these foods are adapted to modern nutritional physiology. Such systems and processes are not known anywhere in the world. In this case, completely new food markets will open up.

In addition, in the production of ice cream substance, in an application of this method, it can be whipped up and frozen at the same time or immediately thereafter, so that it will no longer require any post-hardening by means of cold air at −45° C., in order to achieve the final storage temperature of e.g. −18° C. or −20° C. Due to this method, the process of post-hardening of ice cream is eliminated entirely, so that a continuous process run of freezing and filling is possible, so that the products produced in this manner are ready to ship directly after product filling.

The cooling process (post-hardening) to −20° C. by means of cold air is in itself very investment-intensive from the system point of view-as discussed above—and very long cooling times are needed, since the average freezing of an ice cream product from 5° C. to −20° C. progresses at a rate of only 1 cm/h, so that for example, a 6 cm size cube of ice cream will need a minimum treatment time with cold air of three hours to reach a core temperature of −20° C. In addition to this time-intensive and system-intensive, previously known method, damage to the product will also occur. At a temperature of −5° to −7° C., only 45 to 63% of the existing water will freeze out. The remaining 40%, minus about 5% water, remains as so-called "free water" in the product. This 35% will not freeze until the post-hardening process. Now this water will shift toward the already existing water crystals and cause these crystals to increase in size. The larger the water crystals, the less creamy the taste of the ice cream. Due to post-hardening and the resultant growth in size of the ice crystals, a deterioration of the structure of the ice cream will also occur. The structure changes from creamy soft, to hard, icy and brittle the extreme case. All these disadvantages will be avoided by application of this method.

Even though the starting materials of whipped cream and ice cream are two independent foods, the fundamental problem—namely the production of foams by aeration and freezing down to a temperature range where they are storable, can be readily solved by the method according to the invention.

Thus in the application of the method described above, it is now possible to produce frozen foams down to −18° to −20° C. in one work step by beating (aeration) and then drawing it off continually in a ready-to-ship form.

One particular advantage consists in the fact that the energy costs of the method by comparison to systems operating with post-hardening tunnels in the production of ice cream, lie about 30% or more lower, so that the method will operate particularly economically.

The aerated and frozen foam leaves the system on a continuous basis. All parameters of manufacture of this foam are controllable, such as the outlet temperature, quantity of input (beaten in) air, freezing speed and etc. Due to the control system, the device to carry out the method itself remains in a process-stable state.

In the device described above, the product to be foamed up with air can be aerated by air at 12° C. for example. The aerated product will then be cooled down in a refrigeration or freezer unit, to −5° C. for example, and this will freeze the foam. The foam frozen in this manner, will then be further cooled down to −20° C. for example, in a suitable conveyor unit. The device components can be combined in a single element. The deep freezing tunnel is eliminated entirely by this device.

In particular, in the device disclosed in German Patent No. 3,918,268, the product to be foamed up is beaten in a device in which the foamed product is cooled down either simultaneously, or directly after leaving the foam production unit, in at least one adjoining deep refrigeration device, and exits through an extruder screw and is immediately processed. The foam exiting from the extruder is ready to ship and does not need to be "post-hardened." In addition, several extruder devices according to this state of the art, are run in parallel and/or in sequence. For example, it is possible to let several extruders operate in the coextrusion process. The product fed to the aeration device can be precooled. It is also possible to feed precooled foam to the device and then to cool down this foam to a storage temperature in the extruder device or in one or more apparatus components linked with the extruder device.

SUMMARY OF THE PRESENT INVENTION

The present invention addresses the problem of designing a device of the kind described above in such a manner that the product will be cooled down to storage temperature on a continuous basis by a sensibly designed, relatively simple configuration, and can be homogeneously stressed and well-mixed in the process, with a uniform and homogeneous removal of heat.

These objectives are achieved by the present invention. In particular, a device for the cooling of edible foams is provided, where a cooling or freezing system for pre-freezing of the foam is directly outlet-connected to an aeration system, a motor driven extruder device designed as combined deep freezing and transport device is outlet-connected to the cooling and freezing system, in which the pre-frozen foam can be cooled down to storage temperature, and the aeration device, the cooling or freezing system and the extruder device are connected together by means of pipes. The device of the present invention is characterized in that the extruder device has at least one double screw system with two screws positioned parallel to each other with their rotational axes. The lands of the screws of the double screw system scrape against the inner cylinder mantle surface of the housing surrounding it. The threads of the second screw are centered between the threads of the first screw and an increased spacing of the rotational axes of the screws is created, so that the front side of the screw thread of the other screw facing the surface of the cylinder mantle of each screw, has a radial distance from it. The lands of the screws with the surface of the cylinder mantle of the screws and of the inner surface of the cylinder mantle of the housing bounds an extremely flat screw channel.

The device according to the invention for deep freezing—preferably to storage temperature—of ice cream or other fluids down to temperatures of less than −10° C. with simultaneous production of a creamy condition, implements an essentially homogeneous, mechanical energy input, based on the use of a special double screw system.

The device of the present invention has the following significant features:

a) The screws carry out a slightly opposing meshing motion;

b) The screw channel is designed so that, depending on the flow behavior of the substance being treated, nearly no "flow dead zones" are created, and thus a homogeneous, mechanical energy input will be assured. The local, mechanical energy input specifies the size of the produced structural units—for example, ice crystals—and thus the quality of the product—for example, the creaminess;

c) The removal of heat from the material takes place preferably in a homogeneous manner (inner and outer cooling).

In order to ensure properties a) to c) presented above, the device has the following preferred properties:

1. The screw channels of the double-screw system are of an extremely flat design, with the ratio of the channel height (H) to the channel width (W) for each screw (H/W) is in the range 0.1–0.2, for example. The screw pitch is likewise small. The screw pitch angle $\Theta$ is 20° to 30°.

The precise selection of H/W and $\Theta$ is established under consideration of the flow function $\tau$ ($\gamma$) for the product at the corresponding temperature. In this case it is important that the effective, minimum shear stress on the screw shaft and on the outer cylinder wall, exceeds the yielding point $\tau_o$ of the material.

In this case it must be taken into account that a temperature gradient exists across the height of the screw channel, that is, the material yielding point is a function of the channel radius.

Yield function $\tau$ ($\gamma$, $\nu$) or yielding point $\tau_o$ ($\nu$) are to be determined in rheological measurements ($\nu$=temperature; $\gamma$=shear rate).

2. The double screw system is preferably cooled directly via a fluid evaporating at the surface of the outer mantle, as well as possibly by an interior cooling of the screw. On the outer mantle of the screw channel, a direct "flooding system" or a "flow-through principle," is implemented, for example, by means of holes drilled in the outer cylinder for refrigerant.

3. For an optimum generation of a creamy material system, for example, ice cream that contains a large fraction of dispersed air, it is necessary to ensure the presence of gas during the mechanical deep-freezing treatment process in the double screw system. In this case-as will be discussed in further detail below-the double screw shaft can be sealed by a gas-tight rotating mechanical seal.

In addition to the aforementioned design features, to produce the desired, creamy structure of the deep-frozen material system, it is also necessary to take into account certain "operating criteria."

This includes in particular, the proper dimensioning of the mechanical energy input by selection of an appropriate RPM (depending on the screw geometry). The mechanical energy dissipated in the material system—that is, converted into heat energy—must not exceed a critical value that is specified by the maximum possible heat dissipation established by the cooling system.

In order to ensure this, in a preferred device according to the present invention, to achieve a consistent end product, the speed of the double shaft system will be controlled as a function of the consistency (of the end product). The control and regulation unit disclosed in German Patent No. 3,918,268 may be used in this regard.

Measurement of the consistency can take place here either via a direct measurement in the end product (in-line viscosity measuring cell) or indirectly via the torque on a screw shaft, or by the power consumption of the drive motor.

In summary, the deep-freezing stage in the device of the present invention consists of a double screw system turning in phase or in counter-phase, which will ensure a homogeneous mixing and mechanical stress on the product to be processed, for example, ice cream. This is of decisive importance for the production of a very fine structure with small ice crystals and thus the desired creaminess, while at the same time ensuring a large proportion of frozen-out $H_2O$. At the same time, a homogeneous stressing will be ensured by the selection of the screw channel geometry and by the speed of the turning screw, in such a manner that a super-critical load on the "foam structure" of the aerated ice cream of similar item is prevented, as also is the resultant structural disintegration (in particular: whipping loss).

Under consideration of the structure-related mechanical stress limits of ice cream or similar items, the geometry of the screw channel (and also the screw meshing) and the speed of the screw will also have to be designed with regard to an optimum heat transfer to the coolant under consideration of the energy dissipation due to shearing of the ice cream or similar item.

According to the present invention, the input of mechanical energy into an extremely flat screw channel under gentle screw meshing is performed essentially homogeneously (no local power peaks). In this case, H/W can be $\approx 0.1$, where H=channel height and W=width of channel. As a rule, a screw pitch angle e will be preferably chosen as 20° to 30°. Selection of the screw speed takes place according to the formula, and per this invention, under consideration of the temperature-dependent yielding point $\tau_o$ and also the critical shear stresses for structural change (aeration, loss of creaminess).

In referring to a "double screw system" or "double extruder" or "double screw" this does not preclude that "systems" of this type may be present more than twice, for example, four, six, eight or more times. "Double screw systems" of this or a similar type, can be positioned in parallel and/or in series in one or more housings.

In a preferred embodiment, the housing is a single piece and, in the region of the inner surface of the cylinder mantle for the screws, has several refrigerant channels positioned parallel to the axis and positioned at a distance to each other. This allows refrigerant fluid to flow through these channels in a "flow-through principle."

In an alternative preferred embodiment, the housing of the two screws is located in a container that can be filled with refrigerant in such a manner that the housing is externally "flushed." The refrigerant or evaporative fluid thus flows around housing walls of the double screw system as a direct "flooding system."

To provide for additional, inner cooling of the screw that can be used together with a heating medium for thawing (end of test), screw shafts of hollow design may be used.

In another preferred embodiment, each shaft end is sealed to the outside for the screws by a gas-tight seal designed in particular as a rotating mechanical seal. This design allows for the optimized tailoring of mechanical energy input homogeneous structural stress subcritical shear (minimizing of structural destruction)

Cooling gradient (takes account of dissipated energy)

The freezing process takes place by means of a scattering of mechanical and thermal energy balance on the basis of the acquisition of a temperature profile of the material in the extruder and also the product consistency as target parameter. The product consistency will be determined on the basis of on-line or in-line viscosity measurement.

The device of the present invention may also be provided with a control unit which controls the speed of the screws specifically according to the formula, under consideration of the temperature-related, critical shear stresses for the structural changes for optimum tailoring of mechanical energy input, homogeneous structural stress on the particular product, supercritical shear, cooling gradient and freezing process, by means of acquisition of the product consistency as target parameter. The product consistency is determined by means of an on-line viscosity measurement in such a manner that mechanical energy dissipated in the material system—that is, mechanical energy converted into heat energy—does not exceed a critical amount.

According to this design, the selection of the screw speed takes place according to a specific formula, with consideration of the temperature-related, critical shear stress for the structural change per this invention (loss of aeration, loss of creaminess). For example, at ice cream outlet temperatures of about $-15°$ C., according to this invention, for normal ice cream (about 10% fat percentage) a maximum shear gradient of 30 to 50 $s^{-1}$ will be created. In addition to the avoidance of supercritical stress, the energy input (dissipated) by the shear via the wall cooling per the invention, will be applied by directly evaporating refrigerant in addition to the melt enthalpy of the freezing aqueous phase.

BRIEF DESCRIPTION OF THE DRAWINGS

FIG. 3: Sectional views of the device disclosed in German Patent No. 3,918,268;

DETAILED DESCRIPTION OF THE PREFERRED EMBODIMENTS

It will be understood that the present invention can be implemented in a number of different ways within the scope of the claimed invention hereto. The presently preferred embodiment of the invention will now be described.

Figure 1:
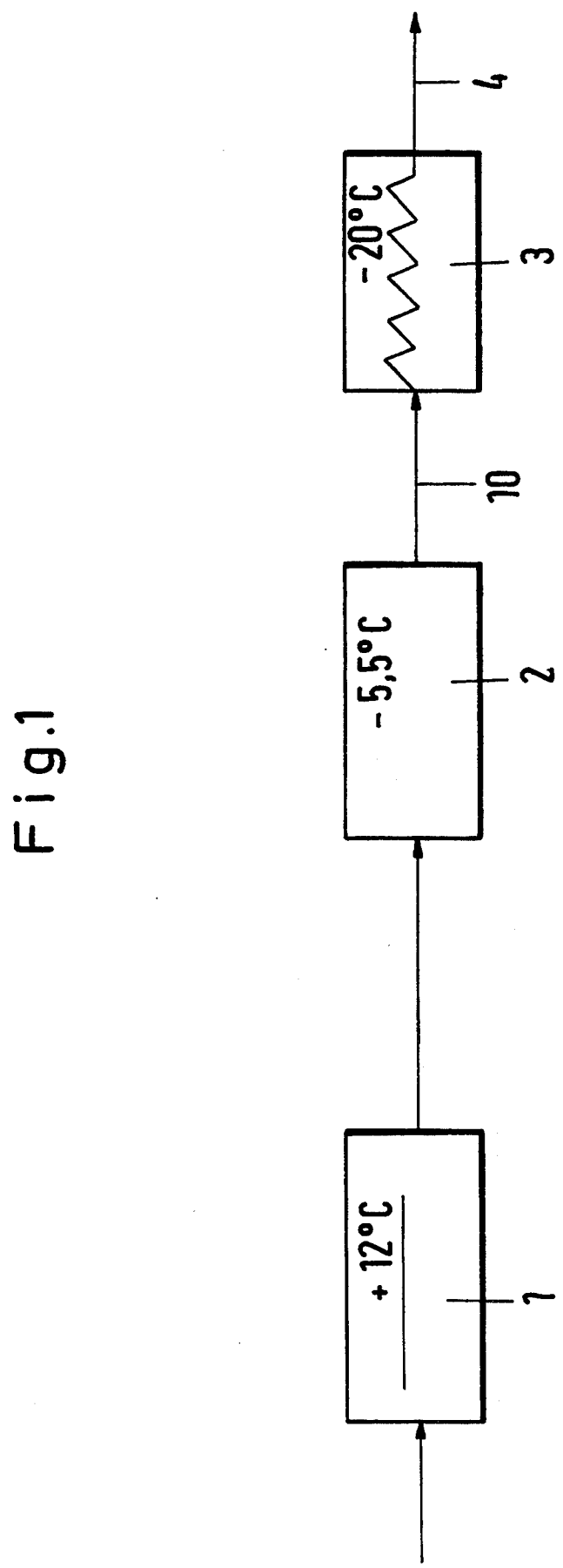
FIG. 1: Schematic illustration of a process flow as disclosed in German Patent No. 3,918,268.

Referring to FIG. 1, reference number 1 is an aeration device in which the product to be foamed is foamed through the admixture of (for example) air. In the aeration device 1, the foam can have a temperature e.g. of 12° C.

The foam produced in this manner leaves the aeration device 1 in the direction of the arrow, and is fed to a refrigerator or freezer, in which the foam is cooled down to e.g. $-5.5°$ C. The prefrozen foam 10 now leaves the refrigerator or freezer 2 in the direction of the arrow and will be fed to a combined extruder device 3. In the extruder device 3, the prefrozen, edible foam will be subcooled down to e.g. $-20°$ C. for storage, and leaves the combined extruder device 3 on a continuous basis as a finished, storable product 4 (foam), e.g. ice cream, whipped cream.

Figure 2:
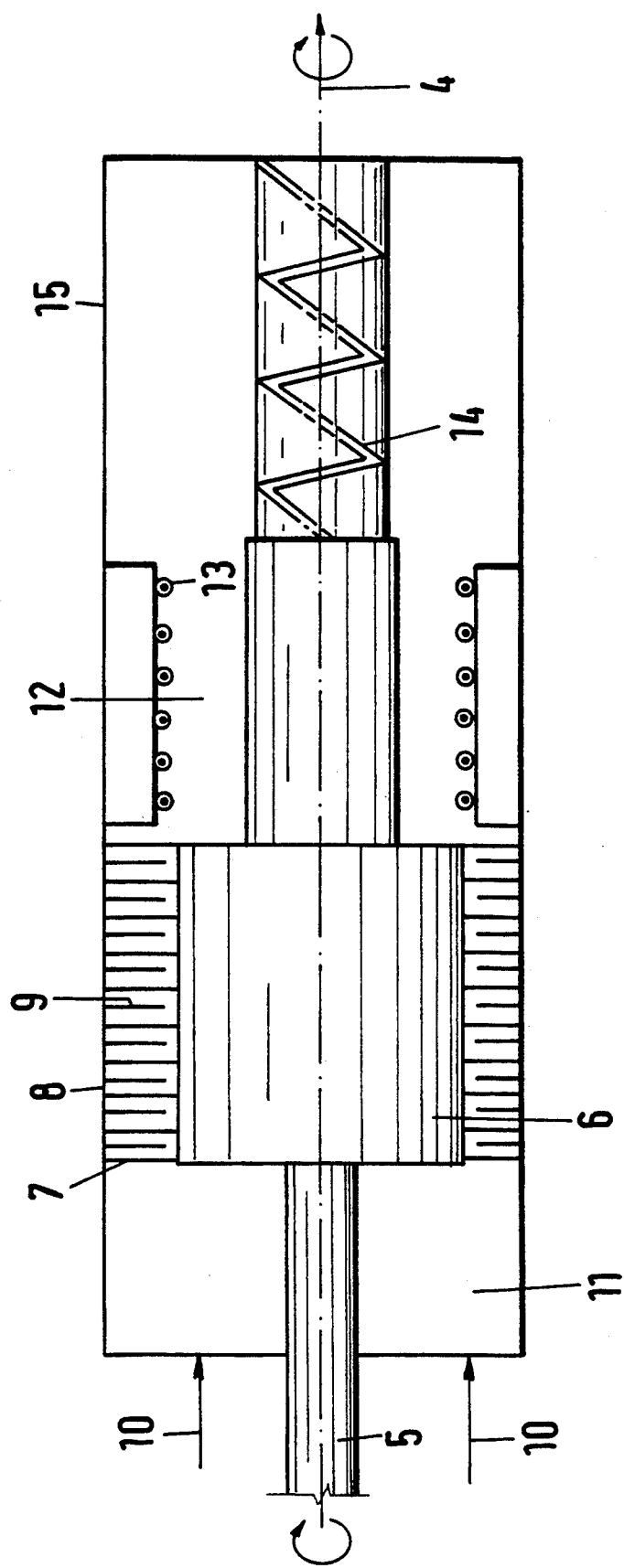
FIG. 2: A section from FIG. 1, enlarged scale, partial cross section.

In FIG. 2, the combined extruder device 3 is shown schematically in cross section. Reference number 5 denotes a shaft driven by a motor (not illustrated) that is connected to a rotor 6. The rotor 6 has several vanes 7 that mesh at a distance with vanes 9 located on a stator 8. The prefrozen foam 10 will be fed to a chamber 11 and thus to the vanes 7 and 9. In this area, suitable cooling devices can be provided that further subcool the prefrozen foam 10. The still thoroughly mixed foam 10 will then be cooled down in an adjoining cooling device 12 down to storage temperature of e.g. $-20°$ C. on a continuous basis in a one-pass method. Cooling coils 13 are indicated schematically in FIG. 2. The storable, cooled foam 4 will be transported away from the device 3 continuously by one or more extruder screws 14. The extruder screw 14 is seated at its end section opposite the shaft 5, in a tubular housing 15 merely indicated schematically, and can be driven by the same motor as the shaft 5.

FIG. 3 shows detailed sectional views of the device disclosed in German Patent No. 3,918,268, for use in connection with the schematic flow presented in FIG. 1. Reference number 1 denotes the aeration stage or aeration device; reference number 2 is the prefreezing stage or the cooling or freezing device, and reference number 3 is the deep freezing stage or the combined extruder device. The aeration device 2 consists essentially of a tubular housing 16 that has an additional tubular housing 17 in the interior; it is positioned coaxial to the outer housing 16, so that between outer and inner housing 16 and 17, an annular space 18 remains; at the one end a coolant inlet line 19 is connected, and to the other end, a coolant outlet pipe 20 is provided. The coolant outlet pipe 20 is connected to a suitable line (not illustrated). The annular space 18 will thus have refrigerant flowing through. As refrigerant, a suitable brine, FRIGEN (TM) or the like, may come into consideration.

In the inner, tubular housing, a rotor 21 is provided with numerous vanes 22 distributed across its perimeter and its length; these vanes are driven by a shaft 23 via a motor (not illustrated).

At the inner wall 24 of the inner housing 17, numerous vanes 25 are also distributed around the perimeter and along its length; these vanes mesh with the vanes 22 with a gap spacing.

On the one front side of housing 16 facing the shaft 23, a feed line 26 is connected. On the one end 27 of this L-piece of the infeed line 26, the particular fluid, that is, the output component of the medium to be foamed, will be fed in, while a suitable foaming gas, air, as a rule, is fed into the feed line 26 through the pipe piece 28. Fluid and carrier gas or air thus enter into the inner chamber 29 and are intensely foamed together by the vanes 22 and 25. The substances prefoamed in this aeration device 1 leave the aeration device 1 via the pipe 30 in the direction of arrow 31 and will be brought into the pipe 32 that is connected to a housing 33 of the refrigerator or freezing device 2.

When flowing through the aeration device 1, fluid and carrier gas will be precooled, and—as in all other stages, that is, aeration device 1, refrigerator or freezer 2 and deep freeze stage 3—coolant and fluid are moving in counterflow to each other. In the refrigerator and freezer unit 2, the foam flows through an annular chamber 34 that is flushed on the outside by coolant that is fed into an annular chamber 36 via an infeed line 35, and then leaves this annular chamber 36 via a run-off line 37.

A rotor 38 is located coaxial to the annular chamber 34, 36; this rotor is driven via a shaft 39 by a motor. The prefrozen foam will be withdrawn via a pipe 40 and sent to a housing 42 of the deep freezer via a connection pipe 41. The housing 42 of the deep freezer stage 3 in turn, has an annular space 43 to which a line 44 is connected for the infeed of coolant. The coolant leaves the annular space 43 via a line 45.

Coaxial to the annular chamber 43 there is a motor-driven conveyor screw 47 for example, that removes the deep frozen foam through a pipe 48. The deep frozen foam will then be processed, packed and transported off in a suitable manner.

Reference numbers 49, 50 and 51 denote thermocouples that can be used to measure the temperature of the deep frozen foam at various places in the deep freezer stage.

In FIG. 3, $V_L$ denotes the volumetric flow of the inlet fluid, $V_g$ denotes the volumetric flow of the inlet carrier gas, and $P_g$ denotes the pressure of the inlet carrier gas at the pipe piece 28, $Tm_1$ denotes the temperature in the inlet line 26, $Md_1$ the torque on the shaft 23, $n_1$ denotes the speed of the shaft 23, $TK_1$ denotes the temperature in the refrigerant runoff pipe 20, $Pm_1$ denotes the pressure in the pipe section 30, $Tm_2$ denotes the temperature in the pipe section 30, $TK_2$ denotes the temperature in the coolant infeed line 19, $TK_3$ denotes the temperature in the runoff line 37, $Md_2$ denotes the torque on the shaft 39, $n_2$ denotes the speed of the shaft 39, $TK_4$ denotes the temperature in the infeed line 35, $Pm_2$ denotes the pressure in pipe 40, $Tm_3$ denotes the temperature in the pipe 40, $Md_3$ denotes the torque on the shaft 46, $n_3$ denotes the speed of the shaft 46, $Tm_5$, $Tm_6$ and $Tm_7$ denote the temperatures of the deep frozen foams measured by thermocouples 49, 50 and 51 in the deep freezer stage, $TK_6$ denotes the temperature in the line 44, $Pm_3$ denotes the pressure in the pipe 48 and $Tm_4$ denotes the temperature in the pipe 48.

Reference numbers 19, 20, 35, 37, 44 and 45 are for the single process stages that denote the particular refrigerant inlets and outlets. The refrigerant temperatures measured at the corresponding sites are denoted as $TK_1$ to $TK_6$. These temperatures will be measured by thermocouples at the appropriate locations.

Additional measurements of temperature take place upon outlet of the material from the single process stages; reference numbers 20, 40 or 48 refer to temperatures $Tm_2$, $Tm_3$, $Tm_4$. Furthermore, at the same locations, the pressure or pressure difference will also be measured ($Pm_1$, $Pm_2$ or $Pm_3$) to determine the consistency (viscous pressure drop).

A measurement of the power or torque $Md_1$ to $Md_3$ and measurements of the rpm $n_1$ to $n_3$, are performed for the drive units of the single process stages, reference numbers 1 to 3.

For the dosed in starting components (fluid, gas), both the volumetric flow $V_L$ and $V_g$ are determined at 27 and 28, and also for the gas, the dosing pressure $P_g$ is determined at 28, and for the mixture of the starting components at position 26, the mixing temperature $Tm_1$ is determined.

In the final process step (deep freezer stage), in order to check the temperature profile, the temperature of the deeply frozen material is determined throughout the duration of the process stage at three additional locations ($Tm_5$ to $Tm_7$).

The target parameters in the manufacturing process of deep frozen foam materials are the temperature of the material $Tm_4$ at the outlet of the deep freezer stage, and the pressure or pressure difference $Pm_3$ (viscous pressure loss) measured at this location, which are a measure for the consistency of the deeply frozen foamed matrix exiting the system. To determine the defined target parameters, the following predetermined parameters are to be adjusted, according to the practical experience of formula development, and their constancy will be checked or controlled: fluid and gas volumetric flow $V_L$ and $V_g$, gas pressure $P_L$, performance data on the drive units $Md_1$ to $Md_3$ and $n_1$ to $n_3$, and also the inlet temperatures of the refrigerant in the single process stages $TK_2$; $TK_4$; $TK_6$ and the mixture inlet temperature $Tm_1$ at 26, and also the back pressure in the aeration stage $Pm_1$.

As pure control parameters, the coolant outlet temperatures will be determined from the single process stages $TK_1$; $TK_3$; $TK_5$, and also the mass temperatures $Tm_2$, $Tm_3$, $Tm_4$, $Tm_5$, $Tm_6$ and $Tm_7$, and the outlet pressure $Pm_2$ from the prefreezing stage.

The decisive control quantities for the foam aeration are the volumetric flows of gas and fluid $V_g$, $V_L$; decisive for the setting of the consistency-target parameters $Pm_3$; $Tm_4$—are the power inlets in the single process stages $Md_1$ to $Md_3$; $n_1$ to $n_3$ and also the speed of the cooling process in the deep freezer stage, which is determined essentially by the inlet temperature of the cooling fluid $TK_6$ (reference number 44).

Figure 4:
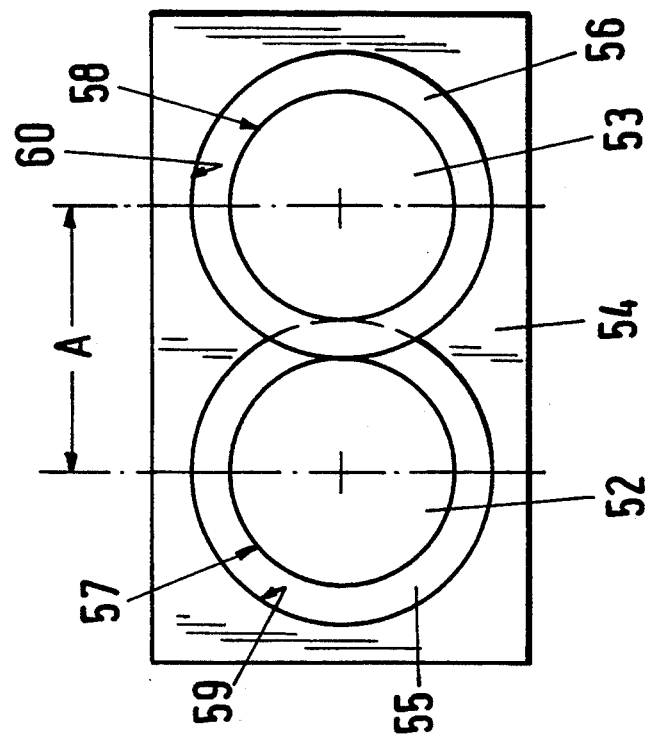
FIG. 4: The double screw system of the present invention in partial, front view.

FIG. 4 shows a partial front view of the double screw system of the present invention. In the present invention, the deep-freezer stage 3 shown in FIG. 3 is provided with at least one double screw system (double screw extruder) that has two screws 52 and 53 meshing lightly with each other. The screws 52 and 53 are seated in the illustrated designs in one particular housing 54. The housing can be made of a metallic material, for example, steel; in particular, a highly alloyed stainless steel.

The two screws 52 and 53 will be driven by a drive unit (not illustrated), for example, jointly or individually by one motor, preferably via an elastic rotary coupling (not illustrated). If necessary, an additional reducing gear can also be provided (also not illustrated).

When referring to "light screw meshing," it is meant that the lands of the screws (helices) 55 or 56 preferably do not intermesh very much, that is, the spacing of the rotary axis A of screws 52 ad 53 will be selected so that the lands (helices) 55 and 56 are positioned with an increased spacing from the surface of the cylinder mantle 58 or 57 of the screws 52 and 53.

Furthermore, the axial positioning of the two screws 52 and 53 is determined preferably such that the helix 55 of the screw 52 penetrates to the middle axial region of helix 56 of the screw 53. This contributes to the avoidance of super-critical stresses of the energy input via shearing.

Figure 8:
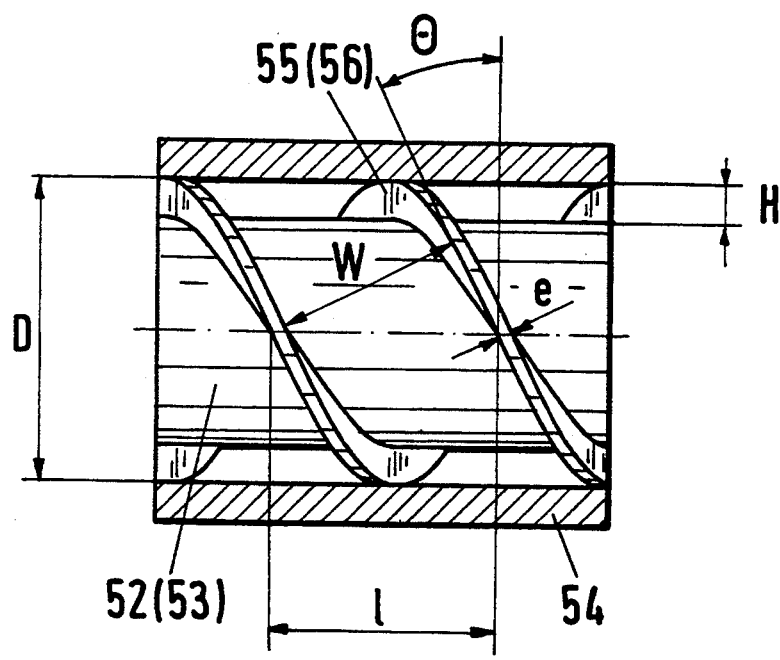
FIG. 8: A sectional representation of a screw according to the present invention with various geometric (design) relations.

The screw channel of each screw 52 and 53 is of extremely flat design (H/W $\approx 0.1$; see FIG. 8). The screw pitch $\Theta$ can also be 20° to 30° in this case.

Figure 5:
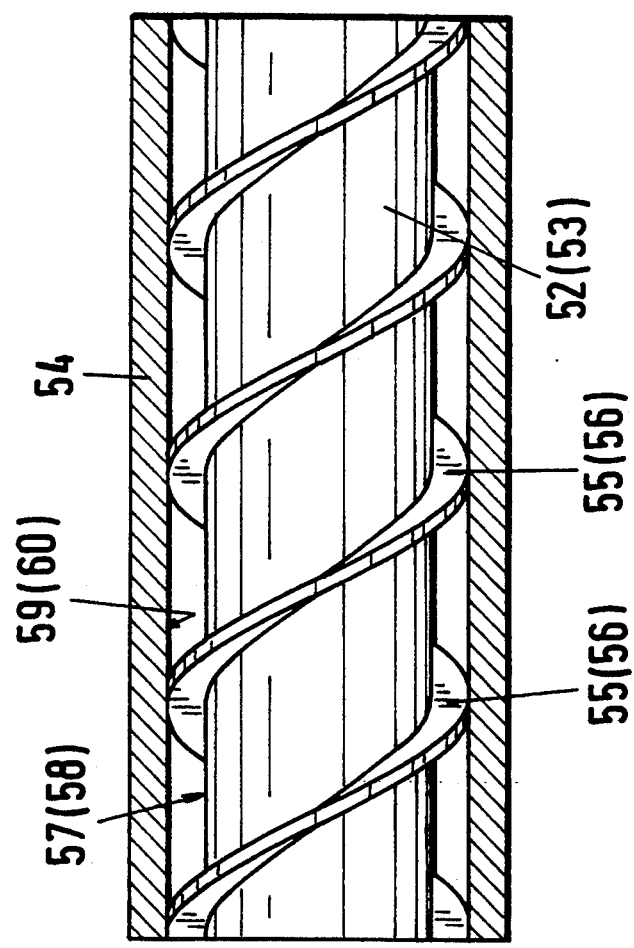
FIG. 5: A partial, longitudinal cross section of FIG. 4.

The helices 55 and 56 scrape against the inner surface of the cylinder mantle 59 or 60 and are thus of a relatively sharp edged design. A partial, longitudinal section of the double screw system of FIG. 4 is shown in FIG. 5.

Figure 6:
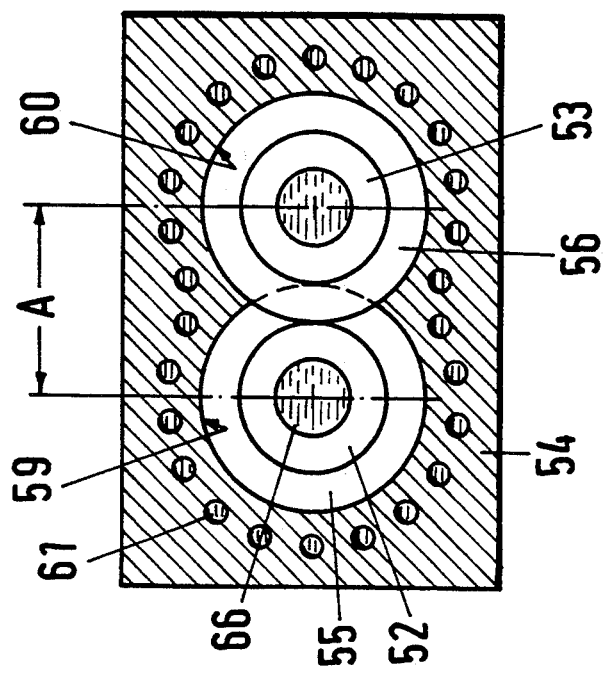
FIG. 6: The double screw system of the present invention including refrigerant channels in the outer cylinder of the screws for the flow of a coolant fluid and also a screw inner cooling (partial cross section)

In the embodiment shown in FIG. 6, numerous coolant channels 61 are provided in the housing 54 in parallel and positioned at a distance from each other, and a suitable refrigerant fluid flows through them in order to deep cool and transport off the aerated and prefrozen foam (for example, ice cream) that is mixed and conveyed from the screws 52 and 53; this deep cooling shall take place to below −10° C., preferably to −16° C. to −45° C., especially to −18° C. to −20° C., at storage temperature. An intensification of the cooling, and an improvement in the homogeneity of the heat elimination will be achieved by an additional inner cooling of the hollow designed screw shafts 66.

Figure 7:
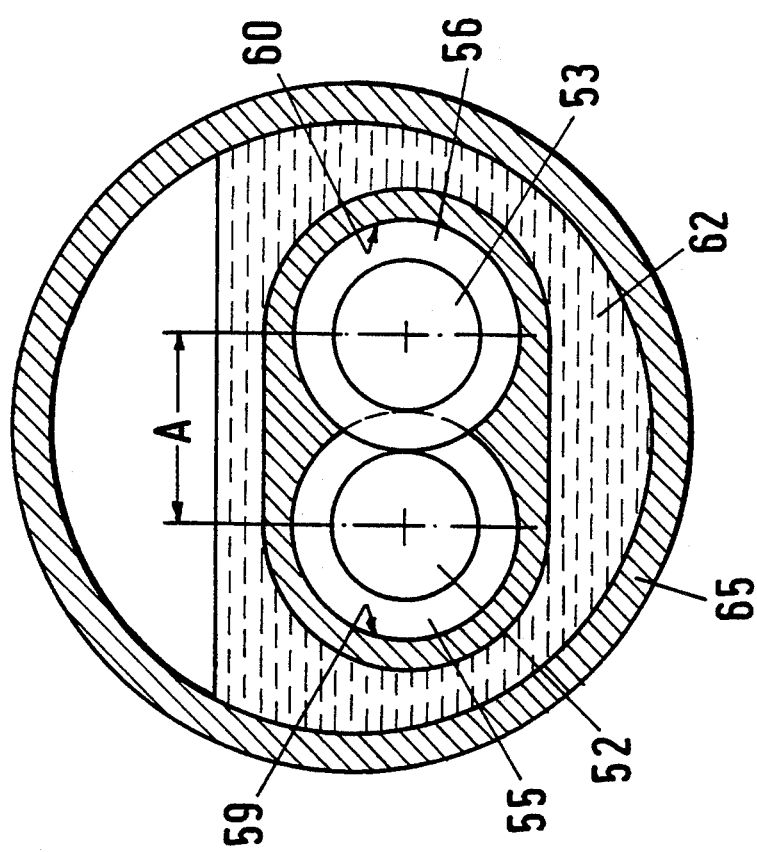
FIG. 7: Another embodiment of the present invention, wherein the double screw system is cooled via a fluid in a "flooding system" evaporating at the outer mantle surface of the housing.
Figure 9:
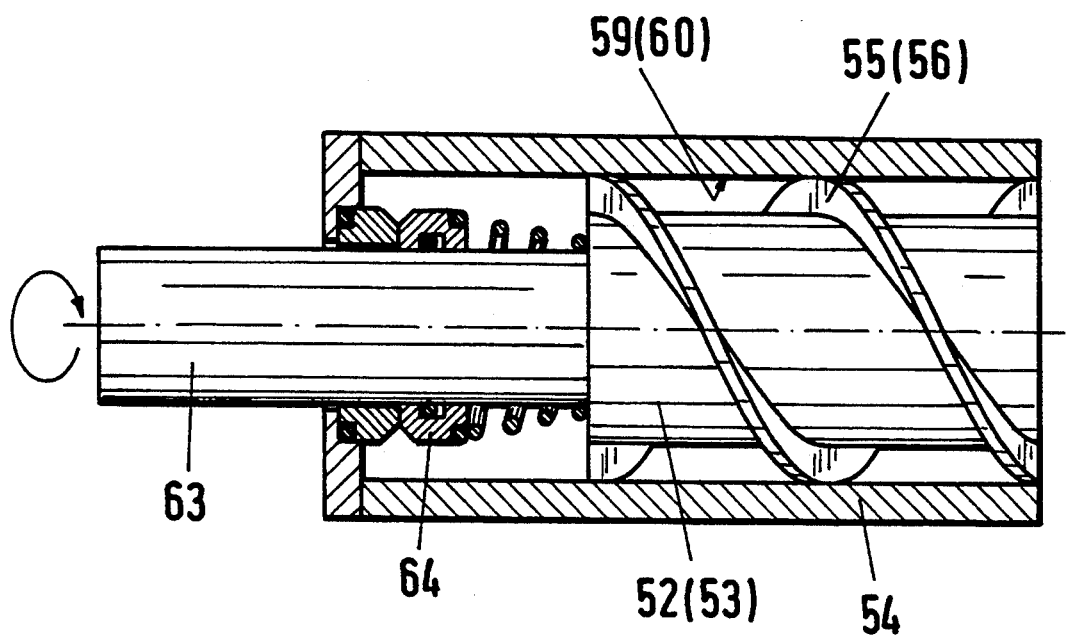
FIG. 9: A longitudinal cross section through a double screw system of the present invention (only one screw visible) with gas seal.

Similarly, in the embodiment shown in FIG. 7, the housing 54 is designed in a roughly flat-oval cross section, with semicircular arcs whose ends are joined by parallel straight lines separated at a distance from each other. The housing 54 is located in a tubular, inner and outer cylindrical container 65 that is partly filled with a refrigerant fluid 62, for example, FRIGEN (TM), brine or the like, and that flushes the housing 54 in order to the cool the foam to be mixed by the screws 52 and 53, for example, whipped cream or ice cream, to storage temperature. Since for the optimum production of a creamy material system, for example, for ice cream, a higher dispersed air fraction is needed, the gas preservation during the mechanical deep freezing treatment process must be assured in the double screw system. Therefore, the shaft end protruding from the housing 54 is sealed to the outside by a gas-tight rotary mechanical seal 64. Of the shaft ends, only the shaft end 63 in FIG. 9 is provided with a reference number. The other shaft end and the hidden gas-tight rotary mechanical seal are also designed with design details similar to those presented in FIG. 9.

Further modifications and alternative embodiments of the device of the present invention will be apparent to those skilled in the art in view of the foregoing description. Accordingly, this description is to be construed as illustrative only and is for the purpose of teaching those skilled in the art the manner of carrying out the invention. It has been understood that the forms of the invention herein shown and described are to be taken as the presently preferred embodiments. Various changes may be made in the shape, size and arrangement of parts. For example, equivalent elements or materials may be substituted for those illustrated and described herein, parts may be reversed, and certain features of the invention may be utilized independently of other features, all as would be apparent to one skilled in the art after having the benefit of this description of the invention. The present invention is therefore intended to embrace all alternatives, modifications and variations that fall within the spirit and broad scope of the appended claims.

List of Reference Numbers

| | |
|---|---|
| 1 | Aeration system |
| 2 | Cooling or freezing system (freezer) |
| 3 | System for transportation and deep-freezing, combined extruder system, deep-freezing stage |
| 4 | Foam, product |
| 5 | Shaft |
| 6 | Rotor |
| 7 | Vanes |
| 8 | Stator |
| 9 | Vanes |
| 10 | Foam, prefrozen |
| 11 | Chamber |
| 12 | Cooling system |
| 13 | Cooling coils |
| 14 | Extruder screw |
| 15 | Housing, tubular |
| 16 | Housing, tubular |
| 17 | Housing, inner |
| 18 | Annular chamber |
| 19 | Refrigerant feed line |
| 20 | Cooling discharge nozzle |
| 21 | Rotor |
| 22 | Vane |
| 23 | Shaft |
| 24 | Inner wall |
| 25 | Vane |
| 26 | Feed line |
| 27 | End |
| 28 | Pipe piece |
| 29 | Inner chamber |
| 30 | Pipe nozzle |
| 31 | Direction indicated by arrow |
| 32 | Pipe nozzle |
| 33 | Housing |
| 34 | Annular chamber |
| 35 | Feed line |
| 36 | Annular chamber |
| 37 | Runoff line |
| 38 | Rotor |
| 39 | Shaft |
| 40 | Nozzle |
| 41 | Connecting nozzle |
| 42 | Housing |
| 43 | Annular chamber |
| 44 | Line |
| 45 | Line |
| 46 | Shaft |
| 47 | Conveying screw |
| 48 | Nozzle |
| 49 | Thermocouple |
| 50 | Thermocouple |
| 51 | Thermocouple |
| 52 | Screw |
| 53 | Screw |
| 54 | Housing |
| 55 | Land of the screw, helix |
| 56 | Land of the screw, helix |
| 57 | Cylinder mantle surface |
| 58 | Cylinder mantle surface |
| 59 | Cylinder mantle surface, inner |
| 59a | Cylinder mantle surface, inner |
| 60 | Refrigerant |
| 61 | Refrigerant channel |
| 62 | Coolant |
| 63 | Shaft end |
| 64 | Rotary mechanical seal, gas-tight |
| 65 | Container |
| 66 | Screw hollow shaft as refrigerant channel (possibly also heating medium for thawing) |
| $Md_1$ | Torque on shaft 23 |
| $Md_2$ | Torque on shaft 39 |
| $Md_3$ | Torque on shaft 46 |
| $n_1$ | Speed of shaft 23 |
| $n_2$ | Speed of shaft 39 |
| $n_3$ | Speed of shaft 46 |
| $P_g$ | Pressure of carrier gas fed in pipe 28 |
| $P_L$ | Gas pressure |
| $Pm_1$ | Pressure in pipe nozzle 30 |
| $Pm_2$ | Pressure in nozzle 40 |
| $Pm_3$ | Pressure in nozzle 48 |
| $Tm_1$ | Temperature in the infeed line 26 |
| $Tm_2$ | Temperature in the pipe nozzle 30 |
| $Tm_3$ | Temperature in the nozzle 40 |
| $Tm_4$ | Temperature in the nozzle 48 |
| $Tm_5$ | Temperature at the thermocouple 49 |
| $Tm_6$ | Temperature at the thermocouple 50 |
| $Tm_7$ | Temperature at the thermocouple 51 |

-continued

List of Reference Numbers

| | |
|---|---|
| $TK_1$ | Temperature in the refrigerant runoff nozzle 20 |
| $TK_2$ | Temperature in the refrigerant inlet line 19 |
| $TK_3$ | Temperature in the line 37 |
| $TK_4$ | Temperature in the inlet line 35 |
| $TK_5$ | Temperature in the line 45 |
| $TK_6$ | Temperature in the line 44 |
| $V_L$ | Volume flow of the fluid at the inlet of line 27 |
| $V_g$ | Volume flow of the carrier gas at the inlet of line 28 |
| A | Spacing of rotational axis of screws 52 and 53 |
| D | Cylinder diameter |
| H | Channel height |
| L | Axial channel height |
| W | Channel width |
| e | Land of the screw |
| Θ | Screw pitch angle |
| p | Number of channels (number of slots) |
| P | Screw pitch (= p * L) |

What is claimed is:

1. A device for the cooling of edible foams, comprising:

a cooling system for pre-freezing an edible foam;

an aeration system outlet-connected to said cooling system;

a motor-driven extruder device designated as a combined deep freezing and transport device outlet-connected to said cooling system for cooling pre-frozen edible foam to a storage temperature, wherein said extruder device has at least one double screw system comprising:

two screws each having a shaft cylinder with a mantle surface on which the threads of the screws are disposed, said screws being positioned parallel to each other with their rotational axes and being further positioned such that the threads of the second screw are centered between the threads of the first screw and an increased spacing of the rotational axes of the screws is created, such that the front side of the screw thread of the other screw facing the surface of the cylinder mantle of each screw has a radial distance from it;

a housing enclosing said screws, said housing having an inner mantle surface proximate to said screws, wherein the threads of said screws are positioned so as to scrape against the inner mantle surface of said housing; and wherein the threads of the screws with the surface of the cylinder mantle of the screws and of the inner mantle surface of the housing bounds an extremely flat screw channel.

2. The device of claim 1, wherein:

a ratio of the channel height to the channel width for each said screw is approximately 0.1; and a screw pitch angle for each said screw is between approximately 20° and 30°.

3. The device of either of claims 1 or 2, said housing having a plurality of refrigerant channels positioned parallel to the axes of rotation of said screws and positioned at a distance relative to each other.

4. The device of either of claims 1 or 2, wherein the shafts of said screws are substantially hollow.

5. The device of any of claims 1 or 2, wherein said housing is sealed by a gas-tight, rotating mechanical seal.

6. The device of any of claims 1 or 2, further comprising a control unit for controlling the speed of rotation of said screw system, whereby the consistency of the foam is determined by means of an on-line viscosity measurement in such a manner that the mechanical energy dissipated in the material system—that is, mechanical energy converted into heat energy—does not exceed a critical amount.

7. The device of any of claims 1 or 2, further comprising a control unit for controlling the speed of rotation of said screw system specifically according to the formula under consideration of the temperature-related, critical shear stresses for the structural changes for optimum tailoring of mechanical energy input, homogeneous stress on the particular foam, super-critical shear, cooling gradient and freezing process, by means of acquisition of the foam consistency as target parameter, whereby the product consistency is determined by means of an on-line viscosity measurement in such a manner that the mechanical energy dissipated in the material system—that is, mechanical energy converted into heat energy—does not exceed a critical amount.

* * * * *

UNITED STATES PATENT AND TRADEMARK OFFICE
CERTIFICATE OF CORRECTION

PATENT NO. : 5,345,781

DATED : September 13, 1994

INVENTOR(S) : Ulrich Fels, Erich Windhab, Ralf Hoffmann, Peter von Holdt, Lutz Hahn It is certified that error appears in the above-identified patent and that said Letters Patent is hereby corrected as shown below:

```
In claim 1, column 15, line 28, delete "designated" and insert
--designed--.
```

Signed and Sealed this

Fifteenth Day of November, 1994

Attest:

BRUCE LEHMAN

Attesting Officer

Commissioner of Patents and Trademarks